United States Patent [19]

Aikawa

[11] Patent Number: 5,443,213

[45] Date of Patent: Aug. 22, 1995

[54] SCREEN APPARATUS FOR PAPER MAKING

[75] Inventor: Yoshihiko Aikawa, Shizuoka, Japan

[73] Assignee: Aikawa Iron Works Co., Ltd., Shizuoka, Japan

[21] Appl. No.: 259,932

[22] Filed: Jun. 13, 1994

Related U.S. Application Data

[63] Continuation of Ser. No. 936,568, Aug. 27, 1992, abandoned.

[30] Foreign Application Priority Data

Aug. 30, 1991 [JP] Japan .................................. 3-244046
Jul. 24, 1992 [JP] Japan .................................. 4-217404

[51] Int. Cl.⁶ ...................... B02C 13/10; B02C 13/20; B02C 13/284
[52] U.S. Cl. ........................................ 241/73; 241/74; 241/89.3; 241/294; 241/285.2; 209/234; 209/273; 209/380
[58] Field of Search .................. 241/73, 74, 861, 89.3, 241/294, 285.2; 162/55, 251; 209/234, 273, 281, 283, 300, 413, 260, 380

[56] References Cited

U.S. PATENT DOCUMENTS

| | | | |
|---|---|---|---|
| 1,973,864 | 9/1934 | Biffar | 209/300 X |
| 2,142,649 | 1/1939 | Lindley | 241/89.3 |
| 3,391,785 | 7/1968 | Hosokawa et al. | 209/300 |
| 3,973,735 | 8/1976 | Ito et al. | 241/73 |
| 4,076,177 | 2/1978 | Hirayama et al. | 241/73 X |
| 4,374,728 | 2/1983 | Gauld | 209/273 |
| 4,440,635 | 4/1984 | Reiniger | 241/86.1 X |
| 4,601,819 | 7/1986 | Pellhammer et al. | 162/251 X |
| 4,632,320 | 12/1986 | Holz et al. | 241/74 X |
| 4,650,125 | 3/1987 | Pellhammer | 209/284 X |
| 4,880,532 | 11/1989 | Meinecke et al. | 209/273 X |
| 4,911,828 | 3/1990 | Musselmann et al. | 162/55 X |
| 5,051,168 | 9/1991 | Hautala | 162/55 X |
| 5,141,650 | 8/1992 | Cavo et al. | 209/273 X |

FOREIGN PATENT DOCUMENTS

| | | | |
|---|---|---|---|
| 0235605 | 2/1987 | European Pat. Off. | |
| 0278260 | 1/1988 | European Pat. Off. | |
| 2377745 | 8/1978 | France | |
| 2547605 | 5/1984 | France | |
| 2918228 | 11/1980 | Germany | 241/89.3 |
| 3238742A | 4/1984 | Germany | |
| 256416 | 11/1969 | U.S.S.R. | 241/74 |
| 988316 | 1/1983 | U.S.S.R. | 162/55 |
| 9202676 | 2/1992 | WIPO | 209/380 |

Primary Examiner—Frances Han
Attorney, Agent, or Firm—Price, Gess & Ubell

[57] ABSTRACT

A screen apparatus for paper making capable of substantially fully recovering fibers from a paper feedstock which has been subject to a pulper and discharging a residue while dehydrating it. A paper feedstock is subject to two-stage maceration and two-stage screening through first and second screen chambers each provided therein with a screen and macerating blade combination. The screens are each cleaned by the macerating blades, so that fiber pieces contained in the paper feedstock are substantially fully recovered with high efficiency and a residue is discharged while being substantially free of fiber pieces and substantially dehydrated.

38 Claims, 7 Drawing Sheets

SCREEN APPARATUS FOR PAPER MAKING

This is a continuation of application Ser. No. 07/936,568, filed on Aug. 27, 1992, now abandoned, for SCREEN APPARATUS FOR PAPER MAKING.

BACKGROUND OF THE INVENTION

1. Field of the Invention

This invention relates to a screen apparatus for paper making which is used for production and treatment of regenerated pulp, treatment of damaged paper, or treatment of waste paper such as newspapers, magazines or the like, and more particularly to a screen apparatus for paper making which is adapted to treat a paper feedstock containing unmacerated fiber pieces to carry out maceration and recovery of the unmacerated fiber pieces and discharge tailings to an exterior of the paper making system.

2. Description of the Related Art

In a paper making process such as the production and treatment of regenerated pulp, treatment of damaged paper, treatment of waste paper or the like, as shown in FIG. 1, a paper feedstock macerated in a pulper is subject to screening using a primary round hole screen and a slit screen and then subjected to dehydration by means of a dehydrator. Tailings obtained by screening the feedstock through the primary round hole screen contain a large amount of unmacerated fiber pieces, therefore, generally the tailings are introduced into a macerator for further maceration and then stored in a chest. Then, the resultant macerated tailings are fed to a secondary round hole screen by means of a pump, so that the available or effective fiber content is recovered from the macerated tailings. Thereafter, the macerated tailings from which the effective fiber content has been separated are fed to a final screen to recover the additional effective fiber content still contained in the tailings and carry out maceration and recovery of unmacerated fiber pieces remaining in the tailings, as well as to discharge any impurity or residue to an exterior of the paper making system. Unfortunately, the residue discharged through the final screen has a concentration as low as 1 to 3% and contains a large amount of water, therefore it is required to further dehydrate the residue before the subsequent treatment and disposal thereof.

Also, in order to promote maceration and recovery of the unmacerated fiber pieces contained in the tailings obtained by screening using the primary round hole screen, it is required to arrange attachment equipment such as the above-described macerator, chest, pump, secondary round hole screen and final screen, as well as valves, pipings and the like, so that facilities for paper making become highly complicated and enlarged and the paper making operation becomes troublesome. Further, as described above, the residue obtained by screening using the final screen contains lots of water, resulting in the handling and treatment thereof being highly troublesome.

SUMMARY OF THE INVENTION

The present invention has been made in view of the foregoing disadvantages of the prior art.

Accordingly, it is an object of the present invention to provide a screen apparatus for paper making which is capable of permitting maceration and recovery of unmacerated fiber pieces, dehydration of a residue, and the like to be effectively carried out.

It is another object of the present invention to provide a screen apparatus for paper making which is capable of significantly simplifying facilities for paper making.

It is a further object of the present invention to provide a screen apparatus for paper making which is capable of permitting paper making to be carried out with a simple operation and at a low cost.

In accordance with the present invention, a screen apparatus for paper making is provided. The screen apparatus includes a first horizontal drum defining a first screen chamber therein; a drum screen arranged in the first screen chamber, resulting in a first fiber recovery chamber being defined outside the drum screen; a feedstock intake port provided at the first screen chamber so as to be positioned inside the drum screen; a first macerating blade means rotatably arranged in proximity to the drum screen in the first screen chamber; a second horizontal drum defining a second screen chamber therein; a screen arranged in the second screen chamber so as to be positioned on the side of a bottom of the second horizontal drum, resulting in a second fiber recovery chamber being defined outside the screen; a residue discharge port provided at the second screen chamber so as to be positioned inside the screen; and a second macerating blade means rotatably arranged in proximity to the screen in the second screen chamber. The drum screen in the first screen chamber and the screen in the second screen chamber are arranged so as to permit insides thereof to communicate with each other.

In a preferred embodiment of the present invention, the residue discharge port may be stationarily arranged. Alternatively, the residue discharge port may be vertically movably arranged.

In a preferred embodiment of the present invention, the first screen chamber and second screen chamber may be coaxially connected directly to each other. The first screen chamber and second chamber may also be arranged in a manner to be inclinable.

In a preferred embodiment of the present invention, the first and second fiber recovery chambers may be provided with fiber recovery ports independent from each other, respectively. Alternatively, the first and second fiber recovery chambers may be provided with a common fiber recovery port.

In a preferred embodiment of the present invention, the second macerating means may comprise multi-stage blades arranged in series. The blades at each stage may include two types of blades.

In a preferred embodiment of the present invention, the second screen chamber may be provided with a jet nozzle for wash water.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a screen apparatus for paper making according to the present invention will be described hereinafter with reference to FIGS. 2 to 9.

Figure 1:
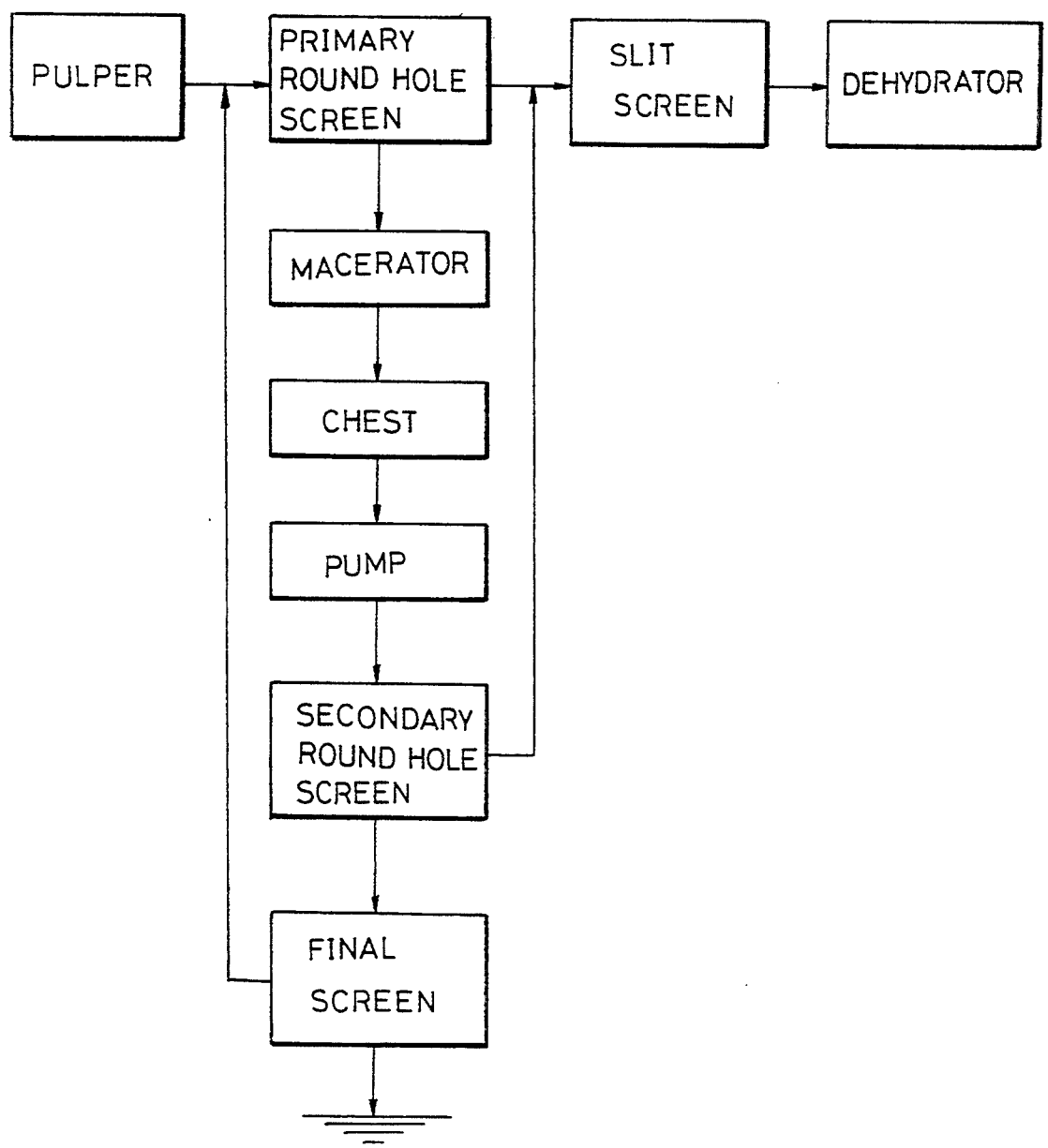
FIG. 1 is a flow chart showing a conventional process for paper making.
Figure 2:
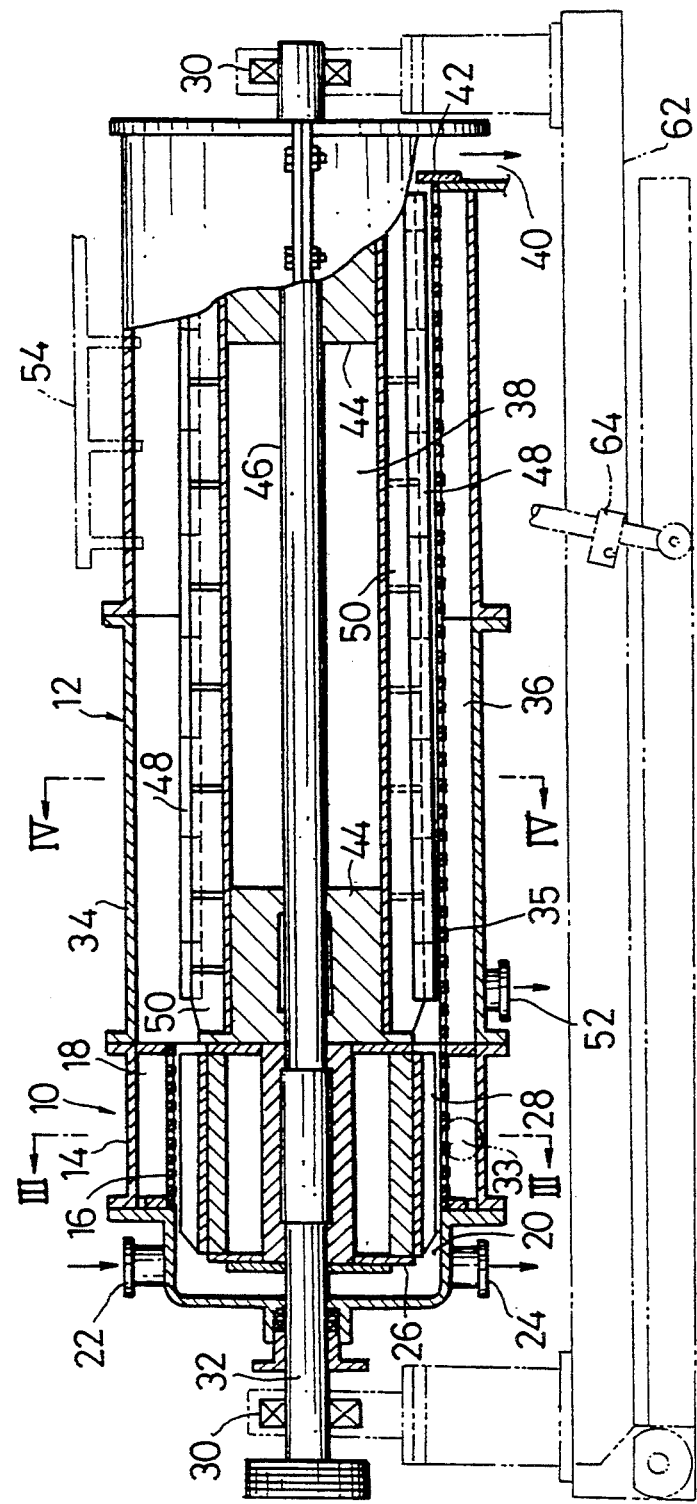
FIG. 2 is a vertical sectional side elevation view showing an embodiment of a screen apparatus for paper making according to the present invention.
Figure 3:
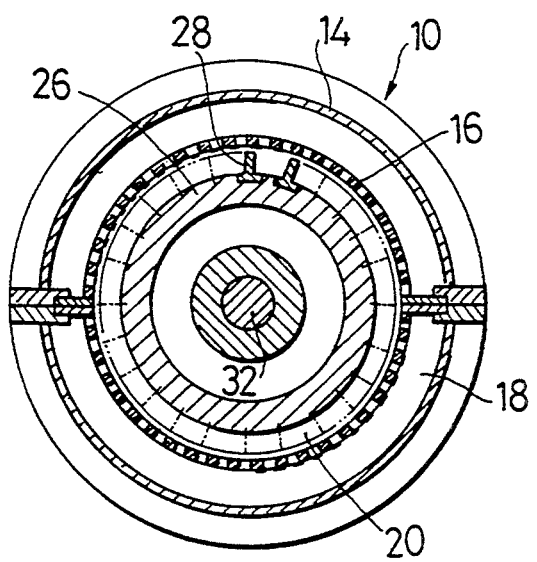
FIG. 3 is a sectional view taken along line III—III of FIG. 2.
Figure 4:
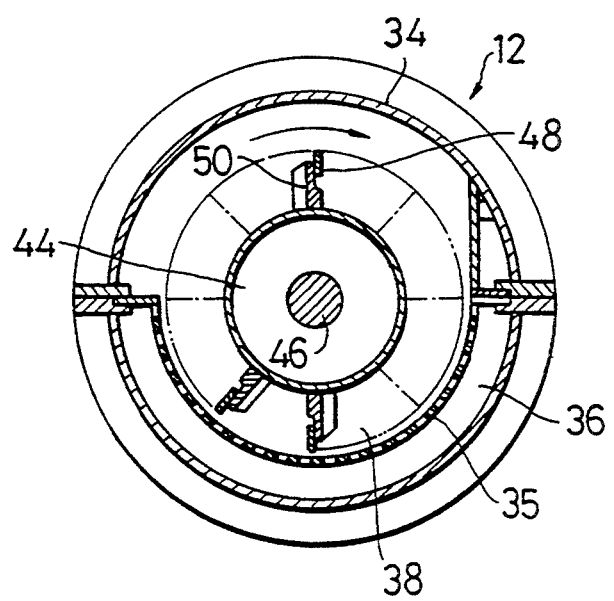
FIG. 4 is a sectional view taken along line IV—IV of FIG. 2.

Referring now to FIGS. 2 to 4 showing an embodiment of a screen apparatus for paper making according to the present invention, a screen apparatus of the illustrated embodiment generally includes a first screen chamber and a second screen chamber which are generally designated at reference numerals 10 and 12, respectively. The first screen chamber 10 is defined in a horizontal drum 14 constructed in a manner to be vertically divided into two halves or splitable in a vertical direction. In the first screen chamber 10 of horizontal drum 14 there is arranged a drum screen 16 which is constituted by a screen plate arranged in a manner to be vertically splitable and formed with round holes or slits, so that a first fiber recovery chamber 18 is defined outside the drum screen 16 and a foreign substance recovery chamber 20 is defined inside the drum screen 16. The foreign substance recovery chamber 20 is provided with a feedstock intake port 22 through which a paper feedstock is fed into the chamber 20, as well as a foreign substance discharge port 24. Also, the foreign substance recovery chamber 20 is provided therein with a rotor 26 which has macerating blades 28 positioned in proximity to the drum screen 16 and radially fixed thereon while being provided with a feed angle. The rotor 26 is supporting on a revolving shaft 32 arranged so as to extend through the horizontal drum 14 and be supported by bearings 30. The revolving shaft 32 thus arranged is driven by a driving unit (not shown). Also, the macerating blades 28, as shown in FIG. 3, each comprise a straight blade of an inverted T-shape detachably fitted or bolted in each of a plurality of recesses radially formed on an outer periphery of the rotor 26 in a manner to extend in an axial direction of the rotor 26 and be replaceable as required. The first fiber recovery chamber 18 in the first screen chamber 10 is provided with a fiber recovery port 33.

The second screen chamber 12 is defined in a horizontal drum 34 constructed so as to be vertically splitable. In the second screen chamber 12 or horizontal drum 34 there is a screen 35 of a semi-circular in section arranged in a manner to be positioned on the side of a bottom of the drum 34. The screen 35 may be constituted by a screen plate formed with round holes or slits. This results in a second fiber recovery chamber 36 being defined outside the screen 35 and a residue recovery chamber 38 being defined inside the screen 35. The residue recovery chamber 38 is provided with a residue discharge port 40. The residue discharge port 40 may be arranged to be stationary or vertically movable. Also, the residue discharge port 40 is provided therein with a vertically adjustable dam plate 42, which functions to adjust a level of fluid in the residue recovery chamber 38, to thereby control a discharge level of the residue discharge port 40. Also, the second screen chamber 12 is provided therein with rotors 44 positioned inside the screen 35. The rotor 44 is mounted on a revolving shaft 46 arranged so as to extend through the drum 34. The rotor 44 is radially mounted thereon with a plurality of macerating blades 48, each of which is positioned in proximity to the screen 35 and provided with a feed mechanism. More particularly, the macerating blades 48, as shown in FIG. 4, are mounted on respective support members 50 fixed on an outer periphery of the rotor 44 in a manner to be replaceable and permit a gap between the blades 48 and the screen 35 to be adjustable. The second fiber recovery chamber 36 is provided with a fiber recovery port 52.

The second screen chamber 12 is provided at an upper portion thereof with a flexible outflow pipe means 54 for wash water, to thereby permit the rotating macerating blades 48 to promote maceration of unmacerated fiber pieces and separation between foreign substances and fibers.

Also, the screen apparatus of the illustrated embodiment is further constructed so that an interior (the foreign substance recovery chamber 20) of the drum screen 16 in the first screen chamber 10 and that (the residue recovery chamber 38) of the screen 35 in the second screen chamber 12 are connected together so as to communicate with each other. For this purpose, the first screen chamber 10 and second screen chamber 12 may be coaxially connected directly to each other to permit the revolving shafts 32 and 46 to be coaxial or common to each other, for example, as shown in FIG. 2.

Figure 5:
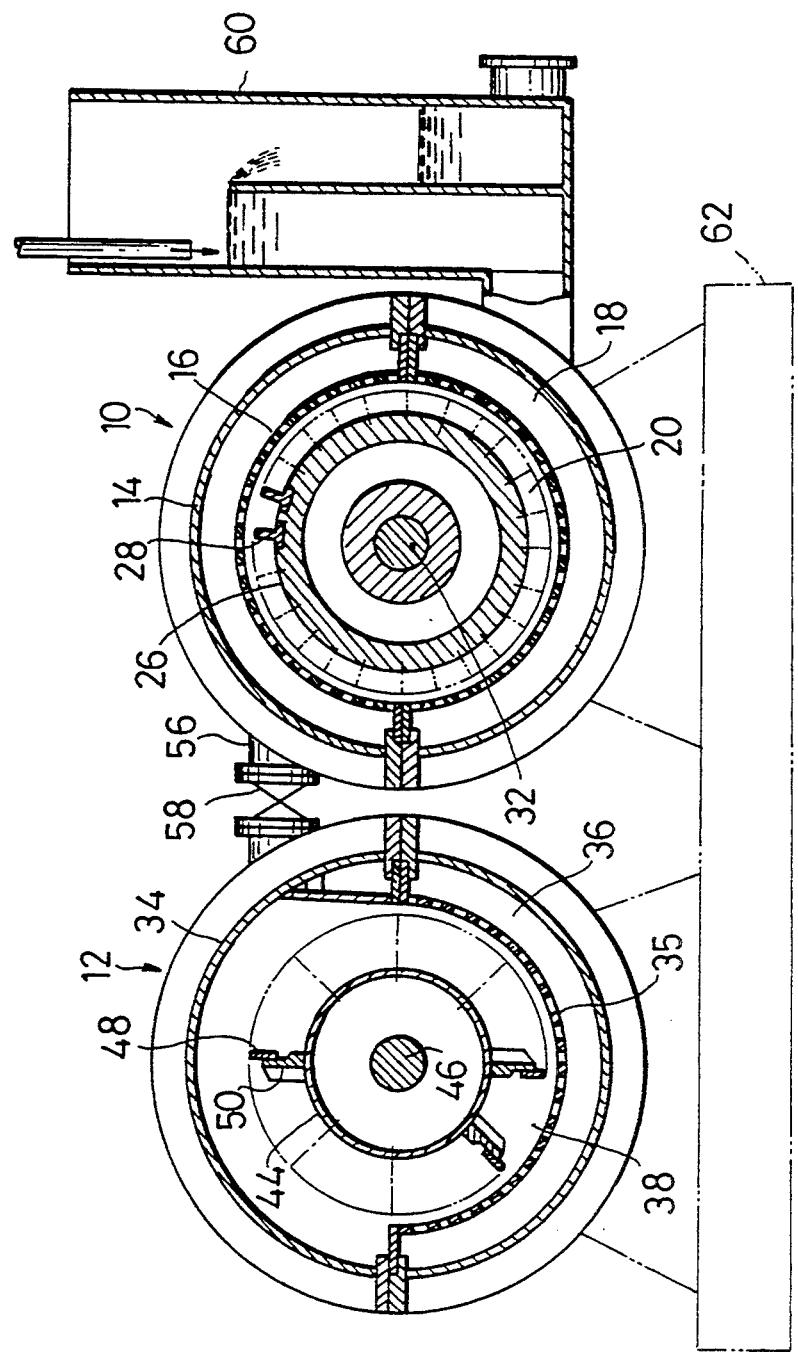
FIG. 5 is a vertical sectional view showing a manner of arrangement of a screen apparatus for paper making according to the present invention.
Figure 6:
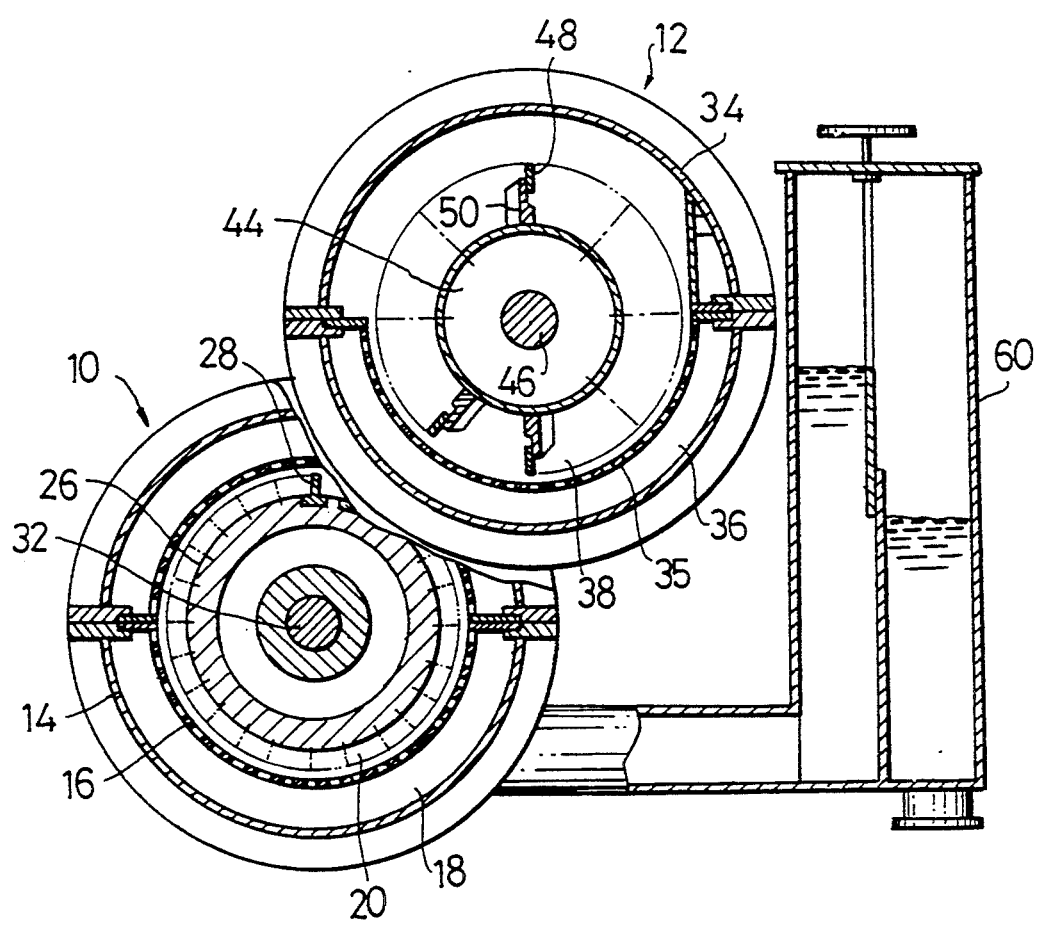
FIG. 6 is a vertical sectional view showing another manner of arrangement of a screen apparatus for paper making according to the present invention.

Alternatively, the first and second screen chambers 12 and 14 may be connected in parallel to each other as shown in FIG. 5. Also, both chambers, as shown in FIG. 6, may be connected to each other while being obliquely separated from each other. In each of the arrangements shown in FIGS. 5 and 6, the insides of the screens may be connected directly to each other by means of a piping 56 provided with a flow control valve 58, as shown in FIG. 5.

In the arrangement shown in each of FIGS. 5 and 6, the first fiber recovery chamber 18 in the first screen chamber 10 is provided with a level tank 60 so that a level of fluid in the screen chamber 10 can be adjusted. Alternatively, a closed pipe may be substituted for the level tank 60.

The screen apparatus of the illustrated embodiment is preferably arranged so as to be inclinable. More particularly, the illustrated embodiment (see FIG. 2) may be so constructed that the screen apparatus is supported on a support frame 62 provided with a tilting mechanism 64 for tilting the support frame 62, resulting in the screen apparatus being inclined, via the support frame 62, by the tilting mechanism 64 as described. This permits the first and second screen chambers 10 and 12 to be arranged in a manner to be inclinable. Such construction permits the second screen chamber 12 to be located at an elevated position as compared with the first screen chamber 10, to thereby permit a residue from the residue recovery port 40 to be discharged while keeping its concentration high. Also, such construction permits the amount of discharge of the residue to be adjusted as desired.

In the screen apparatus of the illustrated embodiment, the first fiber recovery chamber 18 of the first screen chamber 10 and the second fiber recovery chamber 36 of the second screen chamber 12 are provided with the fiber recovery ports 33 and 52 independent from each other, respectively. However, the first and second fiber recovery chambers 18 and 36 may be connected to each other without interposing any partition therebetween. This results in both chambers being provided with a single common fiber recovery port (not shown).

Now, the manner of operation of the screen apparatus of illustrated embodiment described above will be described hereinafter.

First, a paper feedstock is fed through the feedstock intake port 22 to the inside of the drum screen 16 in the first screen chamber 10, so that unmacerated fiber pieces contained in the feedstock are dissociated by the rotating macerating blades 28, resulting in these fiber pieces being changed into short fibers, which are then permitted to pass through the drum screen 16 and are recovered through the first fiber recovery chamber 18. Material which has been prevented from passing through the drum screen 16 is fed from the inside the drum screen 16 to the inside of the screen 35 in the second screen chamber 12, wherein unmacerated fiber pieces still remaining in the material are macerated by the macerating blades 48 and, as required, by using wash water fed from the outflow pipe means 54. Then, the macerated fiber pieces are permitted to pass through the screen 35 and recovered through the second fiber recovery chamber 36. Then, a residue of the material from which the macerated fiber pieces are thus separated is discharged from the inside of the screen 35 in the second screen chamber 12 through the residue recovery port 40 while being dehydrated for the subsequent treatment.

Thus, it will be noted that the paper feedstock is subject to two-stage maceration and two-stage screening and the drum screen 16 and screen 35 are cleaned by the macerating blades 28 and macerating blades 48, respectively, so that the fiber pieces contained in the paper feedstock are substantially fully recovered with high efficiency, resulting in the residue discharged being substantially free of fiber pieces.

It would be expected that the macerating blades 28 will become worn and damaged by foreign substances collected on the inside of the drum screen 16 in the first screen chamber 10. However, the macerating blades 28 are detachably or replaceably arranged and the horizontal drum 14 and drum screen 16 are arranged so as to be splitable, so that the macerating blades 28 worn and/or damaged may be readily replaceable. The same is true of the macerating blades 48. Also, a distance between the screen 16 or 35 and the blades 28 or 48 may be readily adjusted as desired. Thus, maceration by the blades 28 and 48 and cleaning of the screen 16 and 35 are effectively and positively carried out.

Further, a vertical position of the residue recovery port 40 of the second screen chamber 12 can be adjusted to adjust a level of fluid on the inside the screen 35, to thereby efficiently accomplish recovery of the fiber pieces and enhance dehydration of the residue discharged. Moreover, transfer of the feedstock from the first screen chamber 10 to the second screen chamber 12 may be carried out by gravity-flow, and a level of fluid in the second screen chamber 12 may be controlled by adjusting the amount of feedstock fed through the feedstock intake port 24, a level of liquid in the level tank 60, a vertical position of the residue discharge port 40, an angle of inclination of the screen chambers 10 and 12, the flow control valve 58 of piping 50 and the like.

Figure 7:
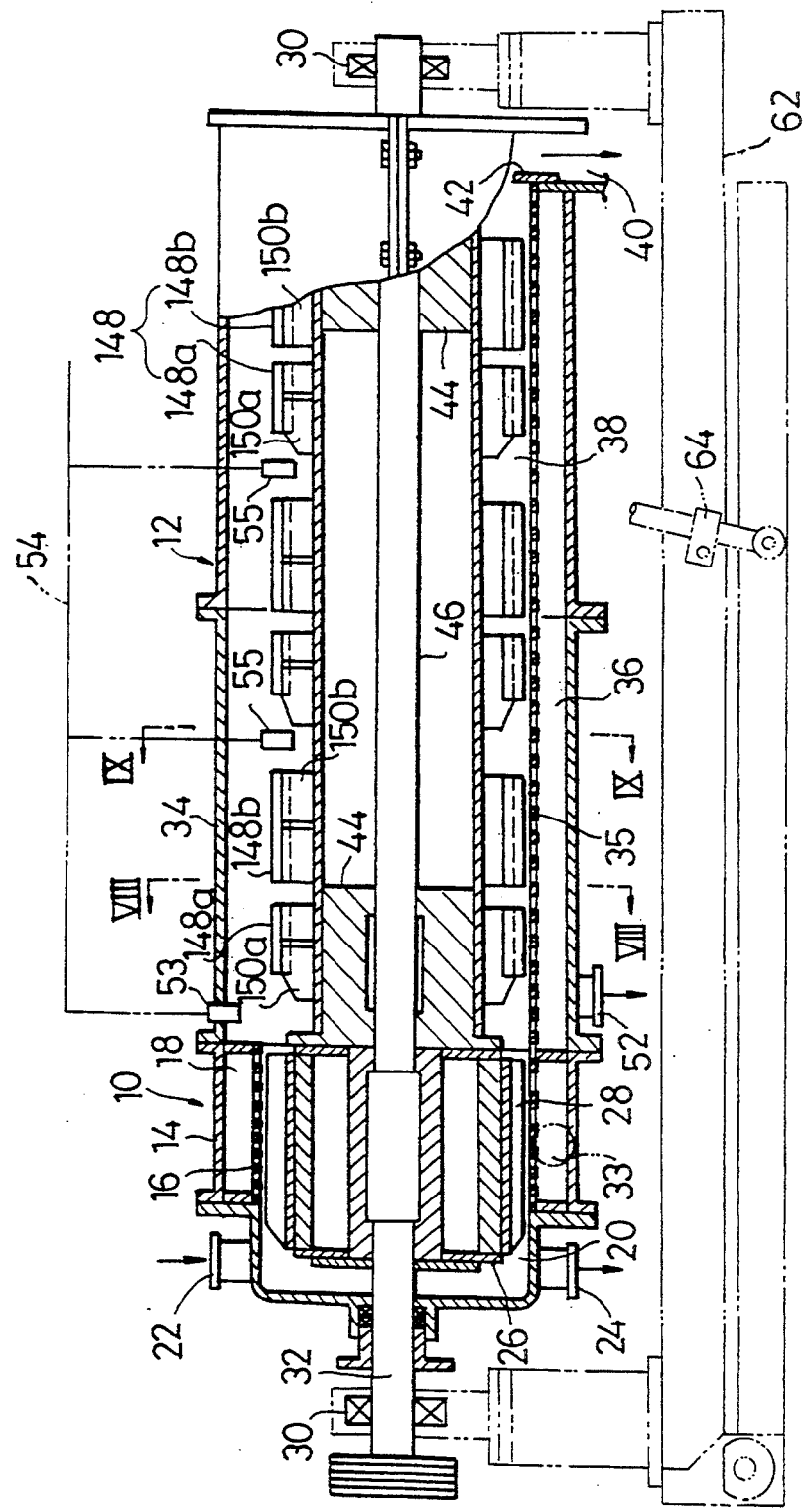
FIG. 7 is a vertical sectional side elevation view similar to FIG. 2 but showing an alternate embodiment of a screen apparatus for paper making according to the present invention.
Figure 8:
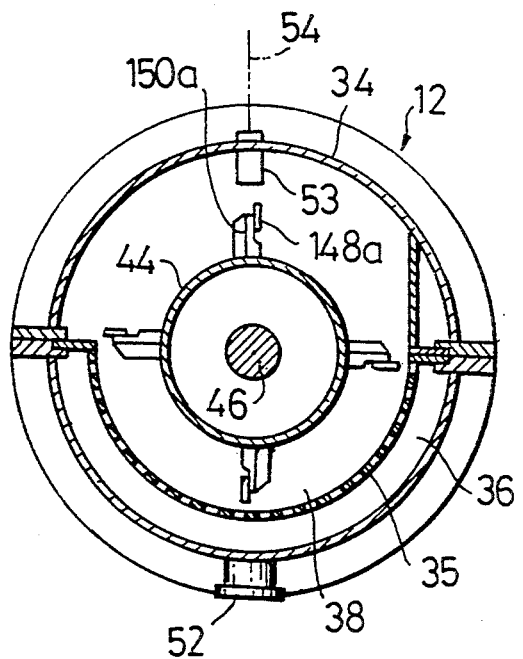
FIG. 8 is a sectional view taken along line VIII—VIII of FIG. 7.
Figure 9:
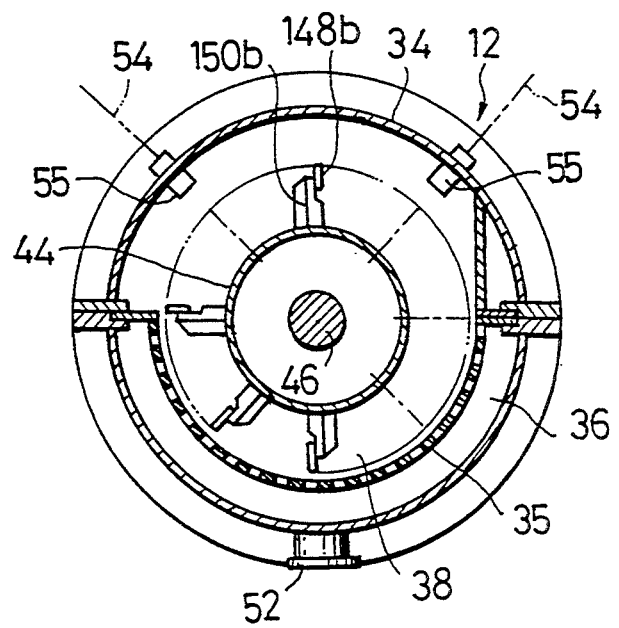
FIG. 9 is a sectional view taken along line IX—IX of FIG. 7.

Referring now to FIG. 7 to 9 there is shown an alternate embodiment of the present invention, a screen apparatus of the illustrated embodiment is similar to that above described with the exception that the second screen chamber 12 is provided therein with modified blades 148 and water feeding nozzles 53 and 55. There are shown three-stage blades 148 mounted on the rotors 44. For example, the blades 148 of each stage include four mixing blades 148a arranged in front thereof for diluting the residue and eight macerating blades 148b arranged in the rear thereof, respectively. Each of these blades 148a and 148b, as illustrated in FIGS. 8 and 9, are mounted on respective support members 150a and 150b fixed on an outer periphery of the rotor 44 in a manner to be replaceable and permit a gap between the blades 148a,148b and the screen 35 to be adjustable. Preferably, each of the blades 148a and 148b is provided with a feed angle from 0 to 5 degrees.

The second screen chamber 12 is provided at an upper portion thereof with a pair of jet nozzles 55 for wash water between the adjacent blade stages in order to wash and dilute both of fiber pieces and a residue, to thereby permit the effective fiber pieces readily to pass through the screen 35. Each of the jet nozzles 55 is connected to the outflow piping 54, preferably through a flow control valve (not shown). Employing a fluidic device of beam deflection amplifier type as a jet nozzle 54 for wash water, in which fluidic device the direction of a supply jet is periodically varied by control jets and vortexes without the use of moving mechanical parts, permits the direction and flow rate of the spraying water to be varied so as to discontinue the flow of the residue partly, resulting in the efficiency of cleaning and macerating due to the rotating macerating blades 148 being increased. Accordingly, the amount of the residue from the residue discharge port 40 to be finally discharged can be decreased.

Alternatively, the mixing blades 148a and the macerating blades 148b at the final stage in proximity to the residue discharge port 40 may each comprise two types of blades, one type of blades having a positive feed angle to feed the residue forwardly and the other type of blades having a negative feed angle to feed the residue backwardly, arranged alternately or include blades having a negative feed angle arranged every second blade so that a residence time of the residue in the second screen chamber 12 can be effectively extended. As required, the second screen chamber 12 may be provided with an additional jet nozzle 53 at an upper portion thereof in front of the blades 148 at the first stage on the opposite side of the residue discharge port 40 so as to spray water for diluting the residue.

As can be seen from the foregoing, the screen apparatus of the present invention permits the first screen chamber to carry out maceration and recovery of unmacerated fiber pieces and the second screen chamber to effectively recover fibers, so that available and effective fibers may be substantially fully recovered to increase productivity. This results in a residue substantially free of fibers being discharged while being kept dehydrated. Thus, the subsequent treatment or disposal of the residue is highly facilitated. Also, the screen apparatus is substantially simplified in structure, simple to operate, and the area required for installing the apparatus is decreased.

While a preferred embodiment of the present invention has been described with a certain degree of particularly with reference to the drawings, obvious modifications and variations are possible in light of the above teachings. It is therefore to be understood that within the scope of the appended claims, the invention may be practiced otherwise than as specifically described.

What is claimed is:

1. A screen apparatus for paper making comprising:
   a first, vertically separable, horizontal drum defining a first screen chamber therein;
   a drum screen arranged in said first screen chamber, resulting in a first fiber recovery chamber being defined outside said drum screen;
   a feedstock intake port provided at said first screen chamber so as to be positioned inside said drum screen;
   a first macerating blade means, comprising replaceable blades rotatably arranged in proximity to said drum screen in said first screen chamber, said blade means disposed to allow adjustment of a gap between said blade means and said drum screen;
   a second, vertically separable, horizontal drum defining a second screen chamber therein;
   a screen arranged in said second screen chamber so as to be positioned on the side of a bottom of said second horizontal drum, resulting in a second fiber recovery chamber being defined outside said screen;
   a residue discharge port provided at said second screen chamber so as to be positioned inside said screen; and
   a second macerating blade means, comprising replaceable blades, rotatably arranged in proximity to said screen in said second screen chamber, said second blade means disposed to allow adjustment of a gap between said second blade means and said screen of said second screen chamber;
   an inside of said drum screen in said first screen chamber and that of said screen in said second screen chamber communicating with each other.

2. The screen apparatus as defined in claim 1, wherein said residue discharge port is arranged in a stationary manner.

3. The screen apparatus as defined in claim 1, wherein said residue discharge port is vertically movably arranged.

4. The screen apparatus as defined in claim 1, wherein said first and second fiber recovery chambers are provided with fiber recovery ports independent from each other, respectively.

5. The screen apparatus as defined in claim 1, wherein said first and second fiber recovery chambers are provided with a common fiber recovery port.

6. The screen apparatus as defined in claim 1, further comprising an outflow pipe means for wash water which is arranged at an upper portion of an interior of said second screen chamber.

7. The screen apparatus as defined in claim 6, wherein said second macerating blade means comprises multi-stage blades, said blades at each stage including first blades arranged in front thereof for diluting a residue and second blades arranged in the rear thereof for macerating fiber pieces.

8. The screen apparatus as defined in claim 7, wherein said outflow pipe means includes a jet nozzle arranged between the stages of said blades.

9. The screen apparatus as defined in claim 8, wherein said jet nozzle comprises a fluidic device of beam deflection amplifier type.

10. The screen apparatus as defined in claim 8, wherein said outflow pipe means further includes an additional jet nozzle which is arranged in said second screen chamber in front of said blades at the first stage on the opposite side of said residue discharge port.

11. The screen apparatus as defined in claim 7, wherein said first and second blades each include two types of blades, one type of blades having a positive feed angle to feed the residue forwardly and the other type of blades having a negative feed angle to feed the residue backwardly.

12. The screen apparatus as defined in claim 7, wherein said first screen chamber and second screen chamber are coaxially connected directly to each other.

13. The screen apparatus as defined in claim 12, wherein said first screen chamber and second screen chamber are arranged in a manner to be inclinable.

14. The screen apparatus as defined in claim 6, wherein said first screen chamber and second screen chamber are coaxially connected directly to each other.

15. The screen apparatus as defined in claim 14, wherein said first screen chamber and second screen chamber are arranged in a manner to be inclinable.

16. The screen apparatus as defined in claim 6, wherein said first and second screen chambers are connected in parallel to each other.

17. The screen apparatus as defined in claim 16, wherein said first fiber recovery chamber in said first screen chamber is provided with a level tank to adjust a level of fluid in said first screen chamber.

18. The screen apparatus as defined in claim 16, wherein insides of said drum screen and screen are connected to each other by means of piping.

19. The screen apparatus as defined in claim 18, wherein said piping is provided with a flow control valve.

20. The screen apparatus as defined in claim 6, wherein said first and second screen chambers are connected to each other while being obliquely separated from each other.

21. The screen apparatus as defined in claim 20, wherein said first fiber recovery chamber in said first screen chamber is provided with a level tank to adjust a level of fluid in said first screen chamber.

22. The screen apparatus as defined in claim 20, wherein insides of said drum screen and screen are connected to each other by means of piping.

23. The screen apparatus as defined in claim 22, wherein said piping is provided with a flow control valve.

24. A paper feedstock fiber macerating apparatus for macerating fiber pieces and discharging tailings comprising:
   a first horizontal drum defining a first screen chamber therein;
   a drum screen arranged in said first screen chamber, resulting in a first fiber recovery chamber being defined outside said drum screen;

a paper fiber feedstock intake port provided at said first screen chamber so as to be positioned inside said drum screen;

a first rotatable rotor assembly mounted within the first screen chamber;

first means for macerating the paper fiber feedstock including a plurality of macerating blade members that are removably mounted on the first rotatable rotor assembly;

a second horizontal drum defining a second screen chamber therein;

a screen arranged in said second screen chamber so as to be positioned on the side of a bottom of said second horizontal drum, resulting in a second fiber recovery chamber being defined outside said screen;

a residue discharge port provided at said second screen chamber so as to be positioned inside said screen;

a second rotatable rotor assembly mounted within the second screen chamber;

second means for macerating a residue of paper fiber feedstock from the first screen chamber including a plurality of macerating blade members removably mounted on the second rotatable rotor assembly; and means for conveying the residue of paper fiber feedstock from the first screen chamber to the second screen chamber.

25. The invention of claim 24 wherein the first horizontal drum has a first rotational axis and the second horizontal drum has a second rotational axis, the respective axes are offset from each other.

26. The invention of claim 24 wherein the macerating blade members of the second means includes multi-stage blades, said blades at each stage including first blades arranged for diluting a residue and second blades arranged for macerating fiber pieces.

27. A paper feedstock fiber macerating apparatus for macerating fiber pieces and discharging tailings comprising:

a first horizontal drum defining a first screen chamber therein;

a drum screen arranged in said first screen chamber, resulting in a first fiber recovery chamber being defined outside said drum screen;

a paper fiber feedstock intake port provided at said first screen chamber so as to be positioned inside said drum screen;

a first rotatable rotor assembly mounted within the first screen chamber;

first means for macerating the paper fiber feedstock including a plurality of macerating blade members that are removably mounted on the first rotatable rotor assembly;

a second horizontal drum defining a second screen chamber therein, said second horizontal drum being offset from said first horizontal drum;

a screen arranged in said second screen chamber so as to be positioned on the side of a bottom of said second horizontal drum, resulting in a second fiber recovery chamber being defined outside said screen;

a residue discharge port provided at said second screen chamber so as to be positioned inside said screen;

a second rotatable rotor assembly mounted within the second screen chamber, an axis of rotation of said second rotor assembly being offset from an axis of rotation of said first rotor assembly;

second means for macerating a residue of paper fiber feedstock from the first screen chamber including a plurality of macerating blade members removably mounted on the second rotatable rotor assembly; and means for conveying the residue of paper fiber feedstock from the first screen chamber to the second screen chamber.

28. The invention of claim 27, wherein the macerating blade members of the second macerating means includes multiple stages of blades, said blades at each stage including first blades arranged for diluting a residue and second blades arranged for macerating fiber pieces.

29. The paper feedstock fiber macerating apparatus as defined in claim 28, further comprising means for providing a jet spray of water on a portion of the residue disposed between the stages of blades.

30. The paper feedstock fiber macerating apparatus as defined in claim 29, further comprising additional means for providing a jet spray on a portion of the residue disposed in front of the blades of a first stage of blades located at an end of said second chamber.

31. A screen apparatus for paper making comprising:

a first horizontal drum including a first upper section and a first lower section detachably joined together so as to define a first screen chamber therein;

a drum screen including an upper member and a lower member detachably joined together and arranged in said first screen chamber, resulting in a first fiber recovery chamber being defined outside said drum screen;

a feedstock intake port provided at said first screen chamber so as to be positioned inside said drum screen;

a first macerating blade means including a plurality of macerating blade members which are removably mounted thereon and rotatably arranged in proximity to said drum screen in said first screen chamber;

a second horizontal drum including a second upper section and a second lower section detachably joined together so as to define a second screen chamber therein;

a screen, semicircular in cross-section, disposed in the lower section of said second screen chamber of said second horizontal drum, resulting in a second fiber recovery chamber being defined outside said screen;

a residue discharge port provided at said second screen chamber so as to be positioned inside said screen; and a second macerating blade means including a plurality of macerating blade members with are removably mounted thereon and rotatably arranged in proximity to said screen in said second screen chamber, said second macerating blade means being disposed to permit the adjustment of a gap between said second macerating blade means and said screen; and an inside of said drum screen in said first screen chamber and that of said screen in said second screen chamber communicating with each other.

32. The screen apparatus as defined in claim 31, wherein said first screen chamber and second screen chamber are coaxially connected directly to one another.

33. The screen apparatus as defined in claim 31, further comprising means for tilting the screen apparatus so that it can be inclined with respect to a support surface.

34. The screen apparatus as defined in claim 31, further comprising an outflow pipe means for wash water which is arranged at an upper portion of an interior of said second screen chamber.

35. The screen apparatus as defined in claim 34, wherein said macerating blade members of said second macerating blade means comprise multiple stages of blades, the blades at each stage including first blade members arranged at an end of the stage nearest a first end of the second chamber for diluting a residue and second blade members arranged at an end of the stage farthest from the first end of the second chamber for macerating fiber pieces, said outflow pipe means including a jet nozzle arranged between the stages of said blades.

36. The screen apparatus as defined in claim 35, wherein said jet nozzle comprises a fluidic device of a beam deflection amplifier type.

37. The screen apparatus as defined in claim 35, wherein said first and second blade members each include two types of blades, one type of blades having a positive feed angle to feed the residue forwardly and the other type of blades having a negative feed angle to feed the residue backwardly.

38. The screen apparatus as defined in claim 35, wherein said outflow pipe means further includes an additional jet nozzle which is arranged in said second screen chamber in front of said blades at a first stage being the stage nearest the first end of the second screen chamber.

* * * * *